United States Patent [19]
Nishida et al.

[11] Patent Number: 5,463,605
[45] Date of Patent: Oct. 31, 1995

[54] METHOD OF PROCESSING INFORMATION OF RECORDING DISC AND APPARATUS FOR PROCESSING THE SAME

[75] Inventors: Junichi Nishida; Morio Araki; Takeharu Arakawa; Tessho Ishida; Yasushiro Ayukai; Toshiharu Baba; Masahiko Sakaguchi; Kenichi Nobe; Michihiro Kaneko; Jun Shinohara, all of Kawagoe, Japan

[73] Assignee: Pioneer Electronic Corporation, Tokyo, Japan

[21] Appl. No.: 388,341

[22] Filed: Feb. 13, 1995

Related U.S. Application Data

[63] Continuation of Ser. No. 59,423, May 4, 1993, abandoned.

[30] Foreign Application Priority Data

May 8, 1992 [JP] Japan ..................................... 4-116446

[51] Int. Cl.⁶ ..................................................... G11B 7/00
[52] U.S. Cl. .................................. 369/58; 369/47; 369/34
[58] Field of Search .................................... 369/47, 48, 53, 369/54, 58, 49, 59, 32, 124, 34, 35, 33, 30

[56] References Cited

U.S. PATENT DOCUMENTS

| | | | |
|---|---|---|---|
| 5,136,569 | 8/1994 | Fennema et al. | 369/58 |
| 5,172,354 | 12/1992 | Otsubo | 369/58 |
| 5,195,066 | 3/1993 | Amemiya et al. | 369/34 |
| 5,245,600 | 9/1993 | Yamauchi et al. | 369/49 |

*Primary Examiner*—Georgia Y. Epps
*Assistant Examiner*—Muhammad N. Edun
*Attorney, Agent, or Firm*—Kane, Dalsimer, Sullivan, Kurucz, Levy, Eisele & Richard

[57] ABSTRACT

A method of processing information of a recording disc among a plurality of recording discs having different standards or recording formats, includes the steps of: selecting and exchanging an objective recording disc to be reproduced among the plurality of recording discs; executing a recording information reproducing operation on the basis of an application program of the selected objective recording disc; and selecting and exchanging the objective recording disc only with respect to the recording discs, having the standard or recording format reproducible by the application program, among the plurality of recording discs after executing the recording information reproducing operation.

8 Claims, 5 Drawing Sheets

METHOD OF PROCESSING INFORMATION OF RECORDING DISC AND APPARATUS FOR PROCESSING THE SAME

This application is a continuation of application number 08/059,423, filed May 4, 1993, now abandoned.

BACKGROUND OF THE INVENTION

1. Field of the Invention

The present invention is related with a method of processing information of a recording disc, and more specifically it is related with a method of controlling an exchange of discs in a magazine changer of a multi CD player etc., and a method of controlling a display of a MENU picture plane.

2. Description of the Related Arts

There is a MCC (Multiple Car Computer) system in a car electronics field. In the MCC system, two or more information processing devices, such as a multi CD (Compact Disc) player, a navigation device, a tuner, and a cassette deck, are connected to one host CPU (Central Processor Unit) through a system bus and an I/O device, so that a bus network is built. All of these devices are controlled in a generalized manner by one host CPU on the basis of input and output operations of a key board and a display device.

As a CD used in the above mentioned system, a CD-ROM (Read Only Memory) in which map data of the navigation device is stored, may be utilized in addition to a CD for music (hereinbelow, it is called as a CD-DA). Further, a CD-ROM XA, in which still picture data for "karaoke" (music accompaniment play) is stored, may be also utilized.

The CD-ROM and the CD-ROM XA differ from the CD-DA in that VD information (Volume Descriptor: description word which appropriately expresses and describes the contents of the stored information in the disc) is written into these CD-ROM and CD-ROM XA, other than the TOC information (table of contents information). This VD information is read at the time of starting the reading operation of the disc, after loading a magazine to the multi CD player. For example, the VD information is used for displaying a title etc. of the disc in the magazine which is loaded in the multi CD player. The magazine is a casing to which a plurality of discs (for example, 6 discs) are packed in one body. The magazine has a structure which makes easy the auto-change of the discs. A magazine changer including an elevation mechanism for changing the disc, a mechanism for discharging a tray which stores the disc in the magazine, and a floating mechanism, etc., is provided on the side of the multi CD player.

In this kind of MCC system, upon selecting the recording disc desired to be reproduced, it is firstly instructed by the key board to display the MENU picture plane, and the MENU picture plane is displayed on the display device. The MENU picture plane has a plurality of hierarchical structure. At the highest MENU picture plane, regardless of the standard or the recording format of the recording discs in the magazine, namely, whether each disc is either of the CD-DA, the CD-ROM and the CD-ROM XA or not, all of the disc are equally treated, so that the reproducing operation is performed according to the recording information (TOC information or the VD information) of the recording disc selected on the MENU picture plane.

However, there is a problem that, upon exchanging the recording discs, the content of the MENU picture plane to select the recording disc does not necessarily correspond to the type of the recording disc which can be actually started, and that there is a possibility that the recording disc which cannot be actually started is also displayed on the display MENU.

Namely, for example, although the operation mode of the MCC system is selected to be the mode for reproducing the CD-DA, not only the CD-DA but also the CD-ROM and CD-ROM XA are displayed on the MENU picture plane. In this case, even if the user selects the CD-ROM or CD-ROM XA on the MENU picture plane, the operation cannot be actually started, which is the great disadvantage of this system. The same thing can be said as for other operation modes. Namely, for example, the CD-ROM XA and the CD-DA are displayed on the MENU picture plane in the navigation mode, to cause the confusion in the operations to the user since these displayed modes cannot be actually used while only the CD-ROM type recording disc can be used in this occasion.

SUMMARY OF THE INVENTION

It is therefore an object of the present invention to provide a method of and an apparatus for processing the information of the recording disc, in which the exchanging operation control can be performed in correspondence with the kind of recording disc to be reproduced in case that there exist various kinds of recording discs in a mixed manner.

According to the present invention, the above object can be achieved by a method of processing information of a recording disc among a plurality of recording discs having different standards or recording formats. The method includes the steps of: selecting and exchanging an objective recording disc to be reproduced among the plurality of recording discs; executing a recording information reproducing operation on the basis of an application program of the selected objective recording disc; and selecting and exchanging the objective recording disc only with respect to the recording discs, having the standard or recording format reproducible by the application program, among the plurality of recording discs after executing the recording information reproducing operation.

According to the method of the present invention, after executing the application program of the selected objective recording disc, the disc exchanging operation is performed within the range of the recording discs which can be reproduced by the application program of thus selected recording disc. Consequently, unnecessary exchanging operations or the confusions in the operation, can be effectively avoided.

In one aspect of the present invention, the selecting and exchanging step after executing the recording information reproducing operation, preferably includes the step of displaying a MENU picture plane such that only the recording discs having the standard or recording format reproducible by the application program, are displayed on the MENU picture plane as the recording discs which can be selected. Consequently, the unnecessary recording discs which cannot be actually started by the application program is prevented from being displayed on the MENU display, so that the confusions in the operation can be effectively avoided in this case.

According to the present invention, the above mentioned object can be also achieved by an apparatus for processing information of a recording disc among a plurality of recording discs having different standards or recording formats. The apparatus is provided with: a selecting device for selecting and exchanging an objective recording disc to be reproduced among the plurality of recording discs; a reproducing device for reproducing recording information on the basis of an application program of the selected objective recording disc; and a controlling device for controlling the selecting device to select and exchange the objective recording disc only with respect to the recording discs, having the standard or recording format reproducible by the application program, among the plurality of recording discs, after the recording information is reproduced by the reproducing device.

Thus, the above mentioned method of the present invention can be performed by use of the apparatus of the present invention, with the same advantageous effect.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

Nextly, the preferred embodiment of the present invention will be explained on the basis of drawings.

First of all, a MCC system, to which a method of reading and processing information of a recording disc according to the present invention is applied, will be explained.

Figure 1:
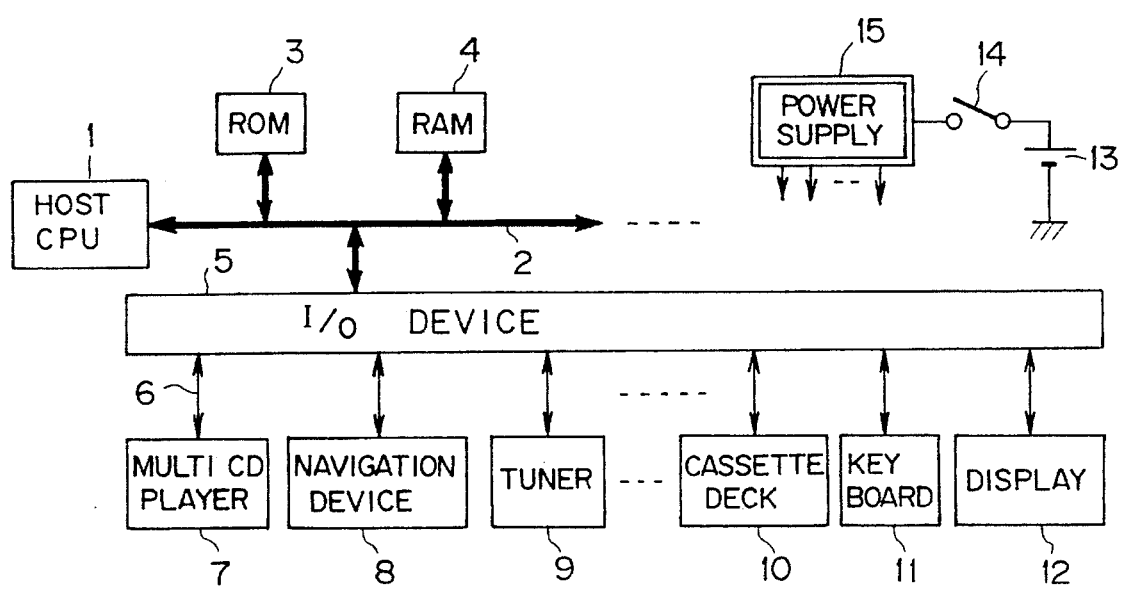
FIG. 1 is a block diagram which shows an example of the whole constitution of a MCC system including a multi CD player of an embodiment of the present invention.

In FIG. 1, a MCC system includes a host CPU 1, a system bus 2, a ROM (Read Only Memory) 3, a RAM (Random Access Memory) 4, and an I/O device 5. The MCC system further includes a plurality of information processing devices such as a multi CD player 7, a navigation device 8, a tuner 9, a cassette deck 10, a KEY board 11, a display device 12, and so on, which are coupled to the host CPU 1 via an I/O bus 6, the I/O device 5 and the system bus 2. An vehicle to which the MCC system is installed, is provided with a power source 13, an ACC switch 14, and a power supply device 15.

All of these information processing devices are controlled in a generalized manner by the host CPU 1 on the basis of the input and output operations of the KEY board 11 and the display device 12.

The multi CD player 7 is adapted to read various CDs such as a CD-ROM storing the map data for the navigation device 8, a CD-DA storing the music data, a CD-ROM XA storing the still picture data for "karaoke" (music accompaniment play).

The CD-DA has the TOC information but does not have the VD information. On the other hand, each of the CD-ROM and the CD-ROM XA has the VD information as well as the TOC information. This VD information is read at the time of starting the reading operation of the disc, after loading a magazine to the multi CD player 7. For example, the VD information is used for displaying a title etc. of the disc in the magazine which is loaded in the multi CD player 7.

The MCC system is provided with a backup power, which is interlocked with the ON/OFF of the ACC 14 switch, so that the data stored in the RAM 4 storing the VD information etc., is prevented from the volatility.

Figure 2:
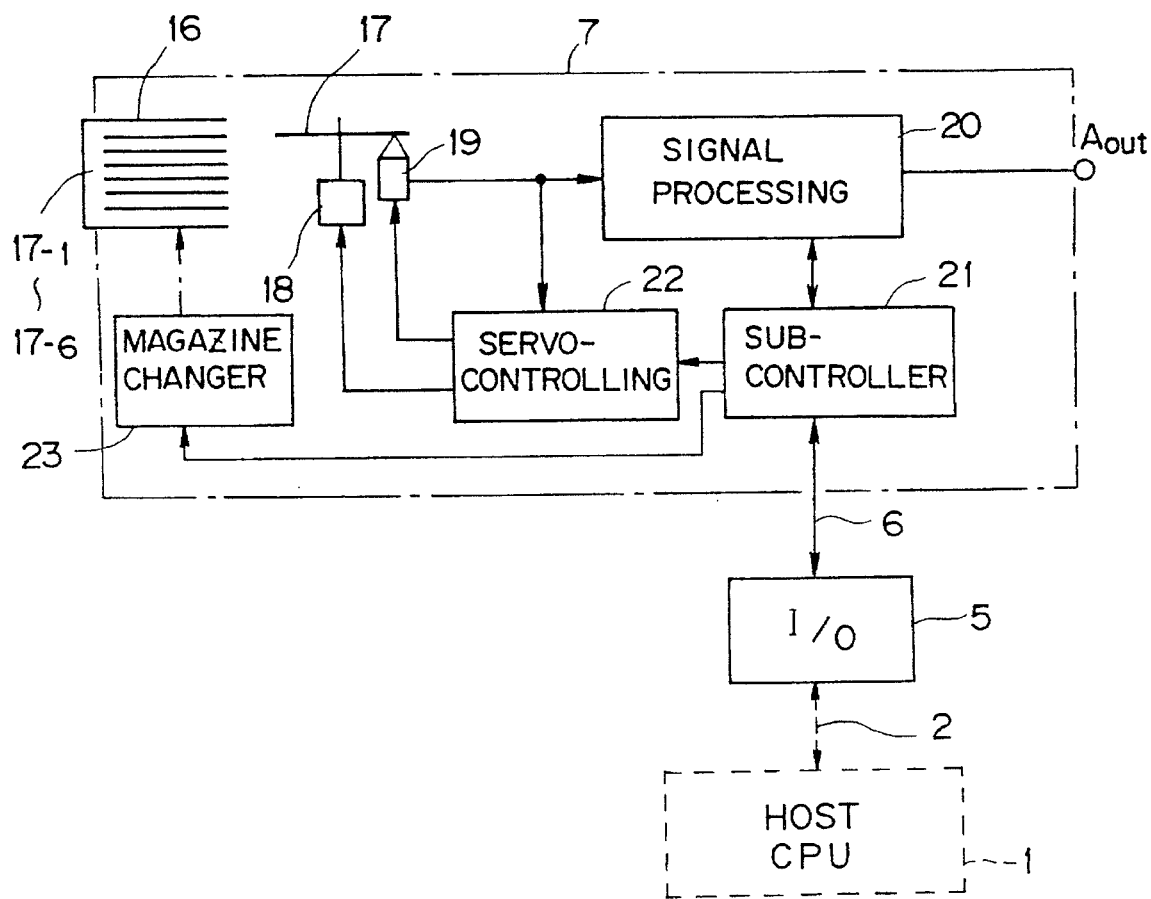
FIG. 2 is a block diagram which shows the MCC system of the embodiment.

FIG. 2 shows the multi CD player 7 which is adapted to performing the method of processing information according to the present invention.

In FIG. 2, the multi CD player 7 is provided with a magazine 16, a CD 17, a spindle motor 18, an optical pickup 19, a signal processing device 20, a sub-controller 21, a servo-controlling device 22, and a magazine changer 23.

A plurality of recording discs 17-1 to 17-6, are accommodated in the magazine 16, such that each of them can be loaded and unloaded on a tray independently. These discs include various discs such as a CD-DA for usual music reproduction, a CD-ROM for navigation, or a CD-ROM XA for music accompaniment play with a still picture and a telop.

Figure 3:
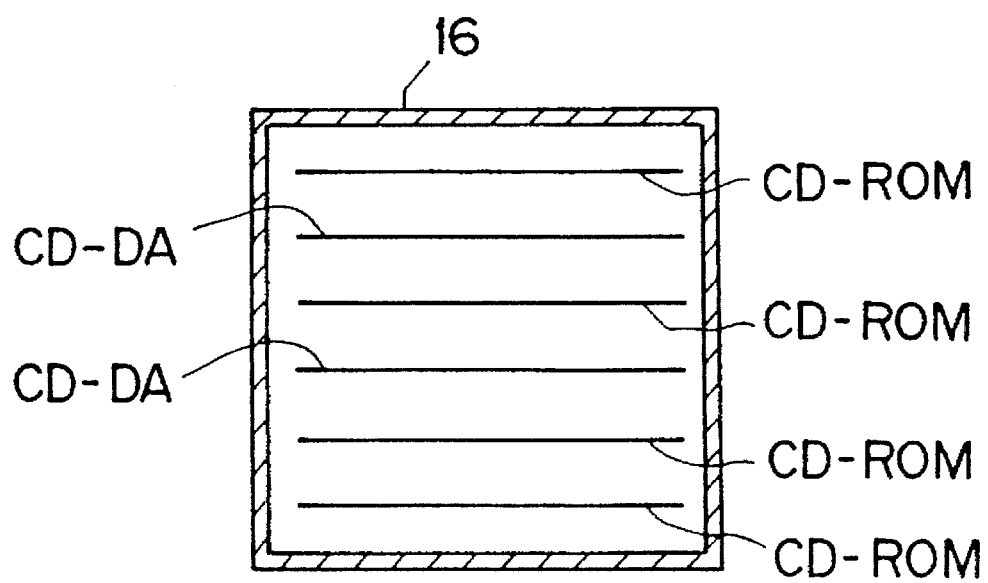
FIG. 3 is a diagram which shows an example of accommodation of recording discs in a magazine of the embodiment.

As shown in FIG. 3, the method of accommodating these various recording discs into the magazine 16, is arbitrary up to the user, and there is no special restriction. Therefore, the recording discs 17-1 to 17-6 in the magazine 16 are not always put in order. The magazine 16 is adapted to enable the auto-change of these recording discs.

In FIGS. 1 and 2, the operation of the MCC system is as following. Namely, when the ACC switch 14 is turned on and the magazine 16 is loaded, the multi CD player 7 carries out scanning of all recording discs 17-1 to 17-6 in the magazine 16. The recording disc 17, which is a reading object, is driven at predetermined number of rotations by the spindle motor 18. The recording information on the recording disc 17 is read by the optical pickup 19. At this time, the required controlling for the number of rotations and the reading positions (controlling for focusing, tracking etc.), are performed by the servo-controlling device 22, with respect to the spindle motor 18 and the optical pickup 19. The RF (Radio Frequency) signal outputted from the optical pickup 19 is subjected to an error correction, a decoding process, etc. by the signal processing device 20. The TOC information and the VD information are transmitted to the host CPU 1 through the sub controller 21, the I/O bus 6, and the I/O device 5. They are stored in the RAM 4 on the side of the host CPU 1. The data Aout is the demodulated data of the CD-DA.

The magazine exchanger 23 is adapted to perform the exchanging operation of the recording discs, i.e. to change the recording disc 17 to the selected one of the recording discs 17-1 to 17-6 on the basis of the control signal from the controller 23.

Nextly, an example of the method of exchanging the discs and controlling the display of the MENU picture plane by the MCC system according to the present invention, which is constituted as mentioned above, will be explained on the basis the flow charts of FIGS. 4 and 5.

Figure 4:
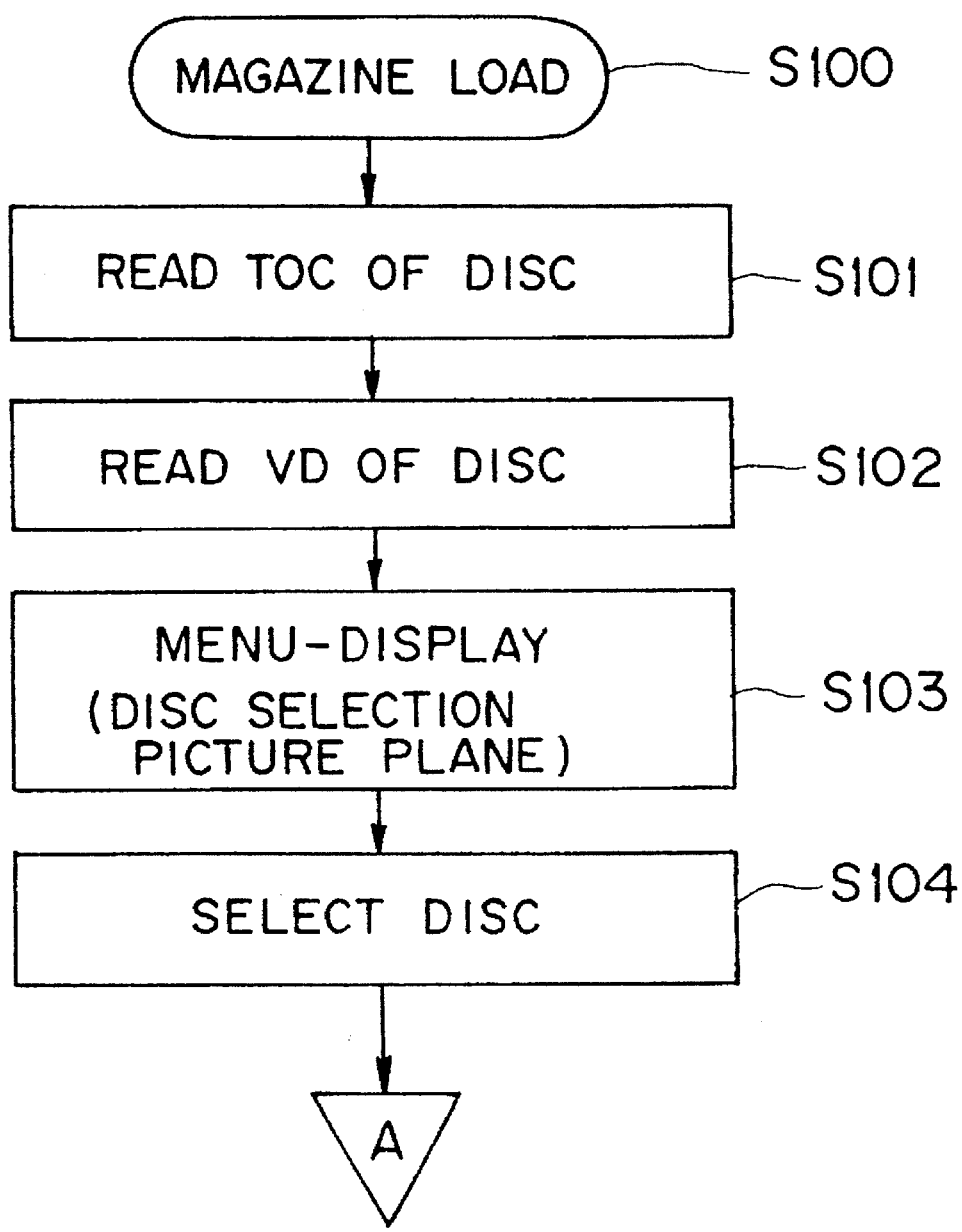
FIG. 4 is a first flow chart of the operation of the embodiment.

In FIG. 4, when the multi CD player 7 is started, it is confirmed by the scanning operation, whether the magazine 16 is loaded to the multi CD player 7 or not, and whether the recording discs exist in the magazine 16 or not. Here, it is assumed that this confirmation is completed. In case that the magazine 16 is loaded (step S100), the host CPU 1 reads the TOC information of each recording disc from the multi CD player 7 (step S101). Nextly, the host CPU 1 reads the VD information of the necessary recording discs (step S102). Since the information such as a title of the recording disc can be recognized by each of the TOC information, the host CPU 1 performs a MENU display on the display device 12 (step S103). This MENU picture plane is a picture plane to select the recording disc.

Nextly, in case that the recording disc is selected by the user from the MENU picture plane (step S104), the operation mode is changed to the mode corresponding to the standard or recording format of the selected recording disc. Then, the operation flow is proceeded to FIG. 5. There are a music accompaniment playing ("karaoke") mode (step S200), a navigation mode (step S300), and an audio mode (step S400) as this operation mode, in the present embodiment.

Figure 5:
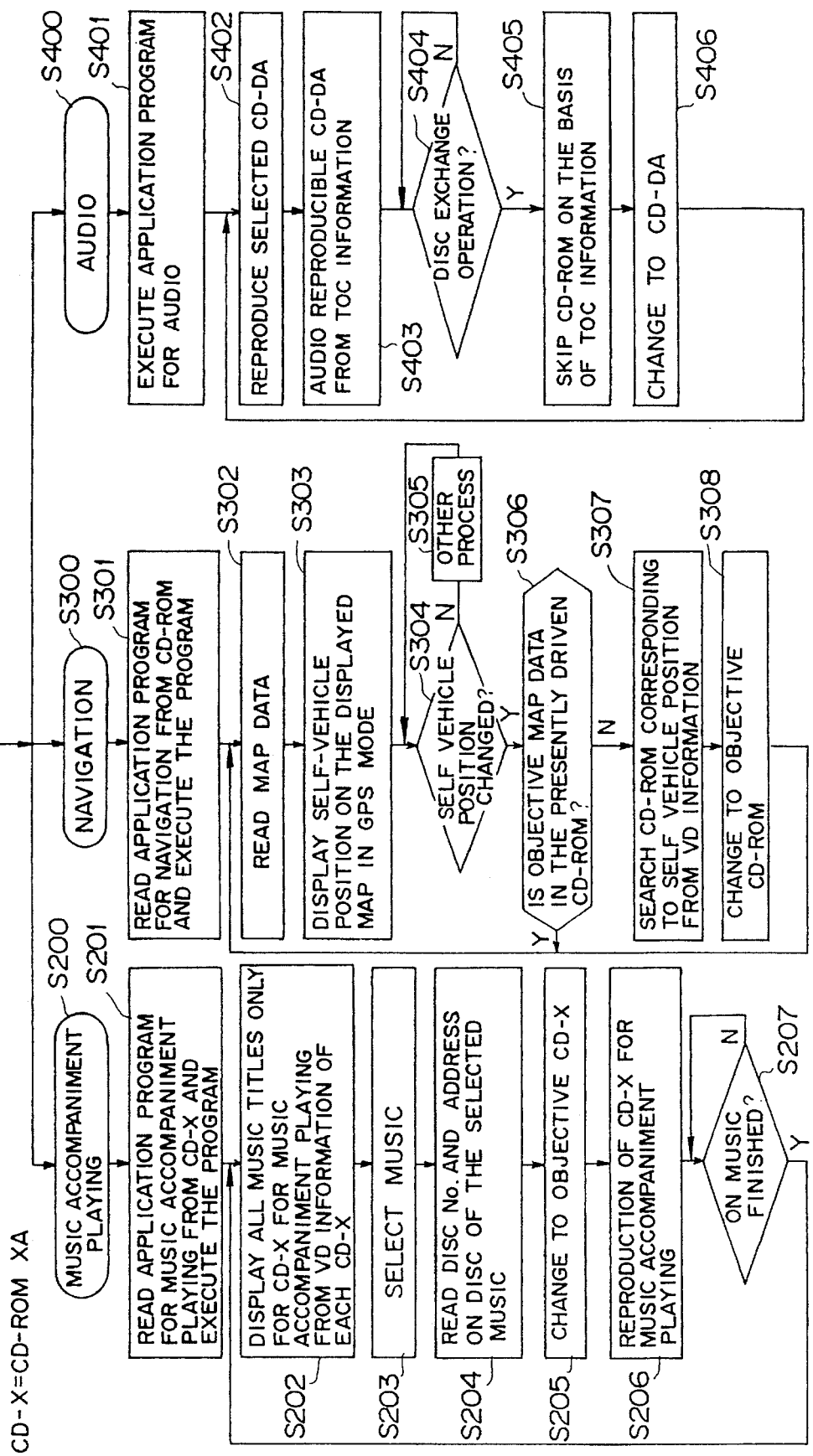
FIG. 5 is a second flow chart of the operation of the embodiment.

In FIG. 5, the operation flow for the music accompaniment playing mode (step S200) will be firstly explained. In this case, the kind of the recording disc is the CD-ROM XA (it is expressed "CD-X" in FIG. 5, for the sake of simplicity). The host CPU 1 reads the application program for the music accompaniment playing which is recorded in the CD-ROM XA via the multi CD player 7, and performs the read program (step S201). Namely, all of the music titles of the music accompaniment playing, which are recorded in the CD-ROM XA, are displayed on the display device 12 from the VD information of the CD-ROM XA (step S202). When the music is selected by the user (step S203), the host CPU 1 reads the disc No. and the address on the disc of the selected recording disc via the multi CD player 7 (step S204). Then, on the basis of thus read information, the host CPU 1 controls the magazine changer 23 to change the present recording disc to the CD-ROM XA which includes the selected music (step S205). Then, the reproduction of the corresponding address portion of the CD-ROM XA, is performed (step S206). When one music is finished (step S207), the flow returns to the step S202, and all of the music titles for music accompaniment playing are displayed on the display device 12 again, so as to wait for the next music selection.

In this manner, if the music accompaniment playing mode is selected at the step S104, in the succeeding reproducing operation, the disc changing operation is controlled so that the selection is performed only within the range of the CD-ROM XAs i.e. the recording discs with respect to which the application program of the presently selected recording disc (i.e. the CD-ROM XA) can be executed, and that the display of the CD-ROM XA or the display of the title is performed within the same range. The disc exchange or the display control with respect to the CD-ROM for navigation, or the CD-DA for music reproduction, which has no relationship with the music accompaniment playing mode, is restricted to be performed in this mode.

Nextly, the operation flow for the navigation mode (step S300) will be explained. In this case, the kind of the recording disc is the CD-ROM. The host CPU 1 reads the application program which is recorded in the CD-ROM on the basis of the VD information of the CD-ROM via the multi CD player, and executes the read program (step S301). Namely, it reads the map data in the CD-ROM (step S302), and, in the GPS (Global Positioning System) mode, it displays the self-vehicle position on the map on the display device 12 (step S303). Nextly, the change in the vehicle position accompanied with the traveling condition of the vehicle is checked (step S304). Then, it is checked the existence of the objective map data corresponding to the present self-vehicle position in the CD-ROM which is presently reproduced (step S306). If the judgement result is YES, the processes from the steps S303 and S303 are repeated for the same CD-ROM. If the judgement result is NO at the step S306, the flow goes to the step S307. At the step S307, the host CPU 1 searches the CD-ROM corresponding to the self-vehicle position from the VD information (in the RAM 4 in FIG. 1), and changes the present CD-ROM to the objective CD-ROM corresponding to the self-vehicle position (step S308).

In this manner, if the navigation mode is selected at the step S104, in the succeeding reproducing operation, the disc changing operation is controlled so that the selection is performed only within the range of the CD-ROMs i.e. the recording discs with respect to which the application program of the presently selected recording disc i.e. the CD-ROM can be executed, and that the display of the self-vehicle position on the map is performed within the same range. The disc exchange or the display control with respect to the recording discs for other mode, which has no relationship with the navigation mode, is restricted to be performed in this mode.

Nextly, the operation flow for the audio mode (step S400) will be explained. In this case, the kind of the recording disc is the CD-DA. The host CPU 1 executes the application program for audio, which is stored in the ROM 3, (step S401). Namely, the reproduction of the selected CD-DA is firstly performed (step S402). At this time, the host CPU 1 displays on the display device 12 the CD-DA which is an audio reproducible recording disc, on the basis of the TOC information stored in the RAM 4, which is read form each CD-DA in advance (step S403). If the CD-DA selection by the user on the basis of this display, is performed, i.e. the disc exchanging operation is performed (step S104, YES), the CD-ROM is skipped according to the TOC information. Namely, since the CD-ROM has nothing to do with the reproduction of the CD-DA, this skipping operation is, for example, performed by the operating the UP/DOWN key in the progressive method, so that the desired CD-DA is selected. As a selecting method other than this progressive method, such a method as to directly specify one of only CD-DAs, which are able to select, on the display by use of the KEY board 11, may be adopted. Thus, the exchange of the present CD-DA to the objective CD-DA, is executed. Then, the operation flow returns to the step S402, where the new CD-DA is reproduced.

In this manner, if the audio mode is selected at the step S104, in the succeeding reproducing operation, the disc changing operation is controlled so that the selection is performed only within the range of the CD-DA, with respect to which the application program of the presently selected recording disc i.e. the CD-DA can be executed, and that the display of only audio reproducible CD-DA is performed within the same range. The disc exchange or the display control with respect to the recording discs for other mode, which has no relationship with the audio mode, is restricted to be performed in this mode.

As described above in detail, after the reproducing operation by the application program of the objective recording disc, which has been selected, the exchanging operation and the MENU displaying operation are controlled to be performed with respect to only discs having the standard or format reproducible by the relevant application program of the selected recording disc. Consequently, the confusion in unnecessary exchanging operation or the confusion in the unnecessary displaying operation can be effectively avoided, according to the present embodiment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of reproducing a recording disc among a plurality of recording discs having different standards or recording formats, comprising the steps of:

selecting one objective recording disc to be reproduced;

executing a recording information reproducing operation on the basis of an application program for said one recording disc; and exchanging said one recording disc by another recording disc, said exchange being governed by whether or not said another recording disc has the same standard or recording format and is reproducible by the same application program as for said one recording disc, among the plurality of recording discs, after executing the recording information reproducing operation on said one recording disc.

2. A method according to claim 1, herein said exchanging step comprises the step of displaying a MENU picture plane such that only the recording discs of the plurality of recording discs having the standard or recording format reproducible by the application program of said recording disc, are displayed on the MENU picture plane as recording discs which may be selected.

3. A method according to claim 1, wherein the plurality of recording discs include a CD-DA for storing music information, a CD-ROM for storing map information, and a CD-ROM XA for storing music accompaniment playing information.

4. A method according to claim 1, further comprising the step of selecting an operation mode among a plurality of operation modes, each corresponding to one standard or recording format of the recording disc, the objective recording disc being selected and exchanged only with respect to the recording discs corresponding to the selected operation mode.

5. An apparatus for reproducing a recording disc among a plurality of recording discs having different standards or recording formats, comprising:

an exchanging means for selecting one recording disc to be reproduced among the plurality of recording discs, and exchanging said one recording disc by another recording disc among the plurality of recording discs;

a reproducing means for reproducing recording information on the basis of an application program for said one recording disc; and controlling means for controlling said exchanging means so that said exchanging is governed by whether or not said another recording disc, has the same standard or recording format and is reproducible by the same application program as for said one recording disc, after the recording information on said one recording disc is reproduced by the reproducing means.

6. An apparatus according to claim 5, further comprising a displaying means for displaying a MENU picture plane, said controlling means controlling the displaying means to display only the recording discs of the plurality of recording discs having the standard or recording format reproducible by the application program of said one recording disc, on the MENU picture line, as recording discs which may be selected.

7. An apparatus according to claim 5, wherein said exchanging means comprises a magazine exchanger.

8. An apparatus according to claim 5, wherein said reproducing means comprises a multi CD player.

* * * * *